United States Patent
Kobayashi et al.

(10) Patent No.: US 6,998,791 B2
(45) Date of Patent: Feb. 14, 2006

(54) DISCHARGE POWER SUPPLY APPARATUS

(75) Inventors: Toshio Kobayashi, Tokyo (JP); Tetsuya Matsumoto, Niiza (JP); Tadashi Masuda, Tokyo (JP); Hiroyuki Ikoshi, Tokyo (JP); Kazuo Sakai, Tokyo (JP); Kiyoshi Komatsu, Tokyo (JP); Kiyomi Watanabe, Kashiwa (JP)

(73) Assignee: Origin Electric Company, Limited, Tokyo (JP)

( * ) Notice: Subject to any disclaimer, the term of this patent is extended or adjusted under 35 U.S.C. 154(b) by 61 days.

(21) Appl. No.: 10/676,974

(22) Filed: Sep. 30, 2003

(65) Prior Publication Data

US 2005/0007034 A1 Jan. 13, 2005

(30) Foreign Application Priority Data

Jul. 11, 2003 (JP) .................................. 2003-273348
Jul. 11, 2003 (JP) .................................. 2003-273349

(51) Int. Cl.
*H05B 37/00* (2006.01)

(52) U.S. Cl. .................. 315/209 R; 315/291

(58) Field of Classification Search ................ 315/224, 315/225, 291, 307, 308, 219, 244, 209 CD, 315/209 R, 247, 276
See application file for complete search history.

(56) References Cited

U.S. PATENT DOCUMENTS

| | | | | |
|---|---|---|---|---|
| 5,103,143 A | * | 4/1992 | Daub | 315/308 |
| 5,422,548 A | * | 6/1995 | Yamashita et al. | 315/308 |
| 6,437,994 B1 | * | 8/2002 | Blom et al. | 315/308 |

* cited by examiner

*Primary Examiner*—Wilson Lee
(74) *Attorney, Agent, or Firm*—Kolisch Hartwell, P.C.

(57) ABSTRACT

This discharge power supply apparatus is for supplying a D.C. voltage to a discharge load 6 and discharging the same. The discharge power supply apparatus includes an inverter circuit 2 that converts D.C. voltage to A.C. voltage; a transformer 3 having a primary winding 3a to which the A.C. voltage output by the inverter circuit 2 is supplied and a secondary winding 3b; a full-wave rectifier circuit 4 that has a plurality of diodes 4A to 4D and rectifies the A.C. voltage generated by the secondary winding 3b; and a trigger capacitor 7 connected in parallel to a part of the diodes of the full-wave rectifier circuit 4.

17 Claims, 10 Drawing Sheets

DISCHARGE POWER SUPPLY APPARATUS

BACKGROUND OF THE INVENTION

1. Field of the Invention

The present invention relates to a discharge power supply apparatus that supplies stationary discharge power following a discharge state that has been caused by the application of a trigger voltage to a discharge load. Priority is claimed on Japanese Patent Application No. 2003-273348, filed on Jul. 11, 2003, and on Japanese Patent Application No. 2003-273349, filed on Jul. 11, 2003, the contents of which are incorporated herein by reference.

2. Description of Related Art

Various types of laser apparatuses, discharge lamps, strobe light apparatuses, electric discharge machines, fusion splicers for optical fibers, thin film formation apparatuses and the like are examples of a discharge loads that use discharge energy. A variety of discharge loads are used in a wide range of fields. The discharge for this kind of load is generated in a vacuum, in a special gas such as an inert gas, or in the atmosphere. To start the discharge, it is necessary to apply a trigger voltage that is higher than the stationary discharge voltage between the discharge electrodes of the discharge load. The trigger power is small in comparison to the discharge power, but when the power supply apparatus does not have the capacity to supply an adequate trigger power, the voltage between the discharge electrodes does not rise sufficiently due to leakage between the discharge electrodes during the triggering (i.e., during the supply of the trigger voltage for starting the discharge), and thereby the discharge state is not attained. After the discharge has been generated between the discharge electrodes, the discharge is maintained for a time at a voltage that is low in comparison to the trigger voltage, and thereby a power that can cause the flow the necessary discharge current can be supplied.

A conventional discharge power supply apparatus is shown in FIG. 13. In FIG. 13, the input side rectifier circuit 51 converts a three-phase alternating voltage to direct current power by rectification, and the inverter circuit 52 converts the direct current voltage output from the input side rectifier circuit 51 to a high frequency alternating current voltage of several kHz to several 10 kHz. The inverter circuit 52 is well known, and normally is pulse width controlled (ON time ratio control). The transformer 53 inputs the high frequency alternating current voltage applied from the inverter circuit 52 at the primary winding 53a, raises the alternating current voltage by a predetermined transformation ratio, and outputs this alternating current voltage from the secondary winding 53b. The alternating current voltage of the secondary winding 53b is converted to a direct current voltage by the full-wave rectifier circuit 54 on the output side, smoothed by the capacitor 55, and applied to the discharge load 56. The discharge load 56 normally is grounded by one terminal, and a negatively biased voltage is applied to the other terminal.

In the conventional discharge power supply apparatus having such a structure, if the commercial alternating current input voltage is AC 200V, the voltage after rectification by the input side rectifier circuit 51 is approximately 260V. Therefore, if the stationary discharge voltage of the discharge load 56 is 500V, the winding ratio of the secondary winding 53b to the primary winding 53a in the transformer 53, that is, the transformation ratio n, can be approximately 2. When the trigger voltage is 1000V, the transformation ratio n must be approximately 4 in order to generate this trigger voltage.

In the conventional discharge power supply apparatus, the inverter circuit 52 is controlled at the maximum pulse width at the start of the discharge, and a trigger voltage of 1000V is generated. The discharge load 56 is triggered by this 1000V trigger voltage, and after transition to the stationary discharge state, the voltage between the discharge electrodes of the discharge load 56 falls to approximately 500V, which is the stationary discharge voltage. Thus, the ON time ratio (pulse width) of the inverter circuit 52 must be made small.

However, when the ON time ratio of the inverter circuit 52 is made small, the peak value of the output current of the inverter circuit 52 increases, and because the effective value increases, there are the problems that the power loss of the switching elements in the inverter circuit 52 becomes large, and the heat of the switching elements and the winding loss of the transformer 53 increase.

In order to eliminate these drawbacks, the apparatus shown in FIG. 14 has been proposed. In this apparatus, the essential elements identical to those in FIG. 13 are denoted by identical reference numerals, and their explanation is omitted. In this conventional apparatus, in addition to the secondary winding 53b, a second secondary winding 53c for supplying an approximately 500V trigger voltage is provided separately in the transformer 3. The voltage of this second secondary winding 53c is rectified by the trigger rectifier 57, and an approximately 500V voltage is applied to both terminals of a bypass diode 59 through the resistor 58. The 500V voltage at both terminals of the bypass diode 59 is superimposed on the 500V rectified voltage of the full-wave rectifier circuit 54, and an approximately 1000V voltage is supplied to the discharge load 56.

In this power supply apparatus, the discharge is started by the application of the trigger voltage, the bypass diode 59 becomes conductive after the transition to the stationary voltage, and the second secondary winding 53c is shorted. Thus, a resistor 58 for controlling the short-circuit current becomes necessary. During the stationary discharge, the resistor 58 consumes the wasted power, and this invites both the lowering of the efficiency and heat generation.

As can be understood from the above explanation, the conventional discharge power supply apparatus has the drawbacks that the structure and control are complicated, power loss occurs, and the cost is high.

It is an object of the present invention to provide an apparatus, in which, using a simple circuit configuration, the control method for the inverter circuit does not become complicated, a large trigger voltage can be supplied at the start of the discharge, and after the start of the stationary discharge, the apparatus can maintain the stationary discharge state while limiting as much as possible the peak of the current that flows through the inverter circuit.

SUMMARY OF THE INVENTION

The discharge power supply apparatus of the present invention includes an inverter circuit that converts direct current voltage to alternating current voltage; a full-wave rectifier circuit that has a plurality of diodes and rectifies the alternating current voltage generated by the inverter circuit; and a trigger capacitor that is connected in parallel to a portion of the diodes of the full-wave rectifier circuit. In this apparatus, at the start of the discharge of the discharge load, a trigger voltage that is higher than the stationary output voltage is supplied to the discharge load, and after the start of the stationary discharge, a direct current output by the full-wave rectifier circuit is supplied to the discharge load.

According to this discharge power supply apparatus, by using a simple circuit configuration, it is possible to apply a voltage that is substantially double the stationary discharge voltage to the discharge load as the trigger voltage. In addition, because the trigger voltage is generated each cycle, the discharge dissipates with difficulty even when the discharge voltage becomes small due to changes in the operating conditions.

The full-wave rectifier circuit can be a full-bridge rectifier circuit providing two pairs of diodes connected serially, and trigger capacitors can be connected in parallel to either pair of diodes.

In this case, by using a simple circuit configuration, it is possible to obtain a trigger voltage that is substantially double the magnitude of an arbitrary a stationary discharge voltage, and it can be applied when the time necessary for the trigger must be shortened or when a high trigger voltage is required.

A transformer having a primary winding and a secondary winding to which the alternating current voltage output from the inverter circuit is supplied can also be provided.

The transformer can have two secondary windings, and the two secondary windings can be connected together serially. The full-wave rectifier circuit can be a center tapped rectifier circuit, this center tapped rectifier circuit can be connected to the two secondary windings, and the trigger capacitor can be charged up to a voltage equal to the sum of the voltages generated by the two windings.

In this case, by using a simple circuit configuration, it is possible to obtain a trigger voltage that is substantially double the stationary discharge voltage, and the time required for the trigger can be reduced.

In the case that the trigger capacitor is connected in parallel to one diode, if the leakage current flowing through the discharge load is denoted by It(A), the stationary discharge voltage is denoted by E(V), and the frequency of the alternating current voltage output by the inverter circuit is denoted by F(Hz), then the capacitance C(F) of the trigger capacitor is $C>It/(E\times F)$, and the capacitance C(F) can be equal to or less than the capacitance at which full-wave rectification is carried out when the discharge load is in the stationary discharge state.

In this case, the control of the inverter circuit does not become complicated and the discharge load reliably attains the discharge state. At the same time, the power loss of the inverter circuit and the transformer and the like can be suppressed.

In the case that the trigger capacitor is connected in parallel to two diodes, if the leakage current flowing through the discharge load is denoted by It(A), the stationary discharge voltage is denoted by E(V), and the frequency of the alternating current voltage output by the inverter circuit is denoted by F(Hz), then the capacitance C(F) of the trigger capacitor is $C>It/(2\times E\times F)$, and the capacitance C(F) can be equal to or less than the capacitance at which full-wave rectification is carried out when the discharge load is in the stationary discharge state.

In this case, the control of the inverter circuit does not become complicated, a high trigger voltage can be applied, and the discharge load reliably attains the discharge state. At the same time, the power loss of the inverter circuit and the transformer and the like can be suppressed.

Capacitors can be connected in parallel to all the diodes of the rectifier circuit, and one of the capacitors among these can be a trigger capacitor having an electrostatic capacitance that is substantially larger that that of the other capacitors.

A discharge power supply apparatus of another embodiment of the present invention includes an inverter circuit that converts direct current voltage to alternating current voltage, a full-wave rectifier circuit that rectifies the alternating current voltage generated by the inverter circuit, a trigger capacitor and a trigger diode connected serially between the input side and the output side of the full-wave rectifier circuit, and a charging diode connected between the input side of the full-wave rectifier circuit and the junction between the trigger capacitor and the trigger diode. This apparatus supplies to the discharge load a trigger voltage that is higher than the stationary output voltage by superimposing the voltage of the trigger capacitor onto the voltage of the secondary winding at the start of the discharge, and supplies to the discharge load direct current power that is output by the full-wave rectifier circuit after start of the stationary discharge.

According to this discharge power supply apparatus, by using a simple circuit configuration, it is possible to apply a voltage that is substantially double the stationary discharge voltage to the discharge load as the trigger voltage. Because the trigger voltage is generated at each cycle, even in the case that the discharge current becomes small due to fluctuations in the conditions and the like, the discharge dissipates with difficulty.

At the output of the full-wave rectifier circuit, a smoothing capacitor or a smoothing capacitor and a bypass diode are provided, and the cathode of the trigger diode and the cathode of the bypass diode can be connected.

In this case, by using a simple circuit configuration, it is possible to obtain a trigger voltage that is substantially double the stationary discharge voltage, and this can be applied when the time necessary for the trigger can be shortened or when a high trigger voltage is required.

A transformer that has a primary winding, to which the alternating current output voltage of the inverter circuit is applied, and a secondary winding, can also be provided.

The transformer can have two secondary windings that are connected serially, the full-wave rectifier circuit can be a center tapped rectifier circuit consisting of a pair of diodes that are connected serially to the respective terminals of the two secondary windings, and the charge diode can be connected between the junction of the two secondary windings connected serially and the junction between the trigger capacitor and the trigger diode.

In this case, by using a simple circuit configuration, it is possible to obtain a trigger voltage that is substantially double the stationary discharge voltage, and the time required for the triggering can be reduced.

The transformer can have an auxiliary winding connected serially to one end of the secondary winding, and the charging diode can be connected between the other terminal of the auxiliary winding and the junction of the trigger capacitor and the trigger diode.

In this case, by using a simple structure, it is possible to obtain a trigger voltage that is substantially double the stationary discharge voltage, and the time required for the triggering can be shortened.

If the discharge current before the start of the discharge is denoted by It(A), the discharge voltage in the stationary discharge state is denoted by E(V), and the conversion frequency of the inverter circuit is denoted by F(Hz), then the capacitance C(F) of this capacitor may be a value that satisfies the formula $C>It/(F\times E)$.

In this case, without the control of the inverter circuit becoming complex, the discharge load can reliably attain the discharge state, and it is possible to suppress the power loss of the inverter circuit, transformer and the like.

DETAILED DESCRIPTION OF THE INVENTION

Below, the embodiments of the present invention will be explained with reference to the figures. However, the present invention is not limited to only these embodiments, and various modifications within the scope of the claims are possible. For example, the essential elements in each of the embodiments can be interchanged, well known essential elements can be added, or a portion of the essential elements can be omitted.

Figure 1:
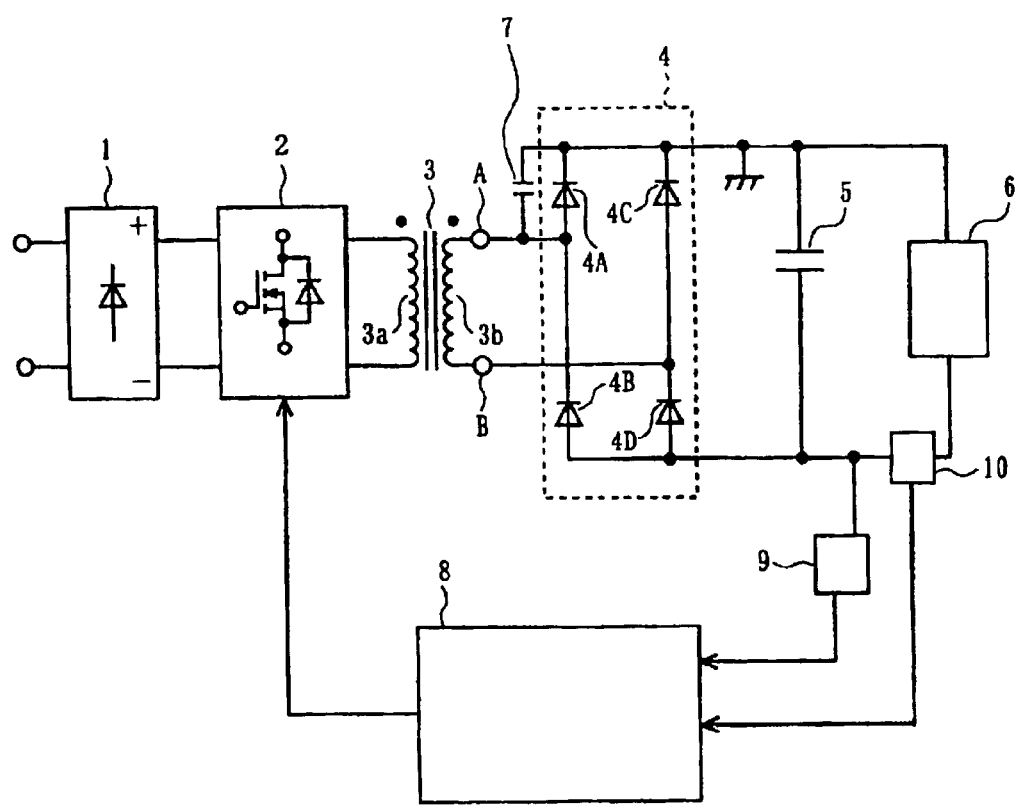
FIG. 1 is a circuit diagram showing discharge power supply apparatus of the first embodiment of the present invention.
Figure 2A:
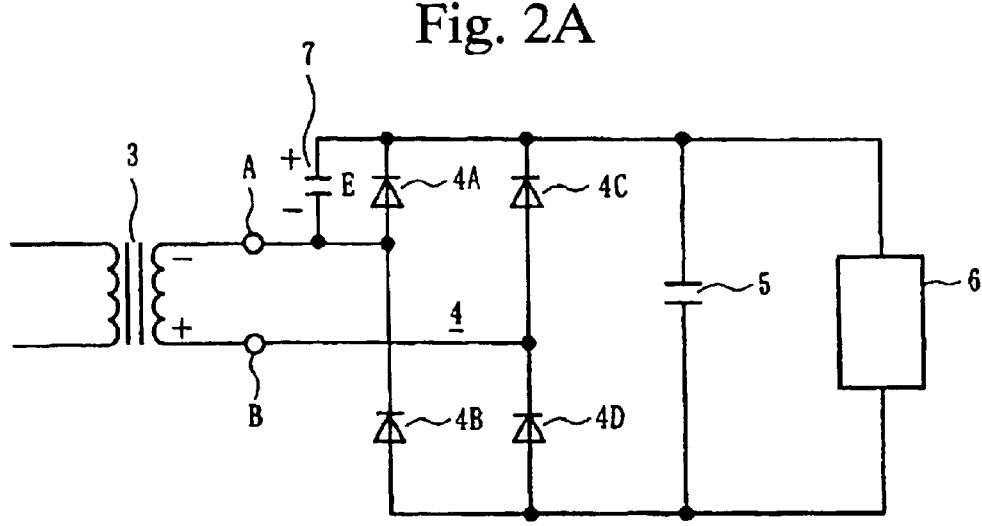
FIGS. 2A to 2C are circuit diagrams for explaining the operation of the discharge power supply apparatus shown in FIG. 1.
Figure 2B:
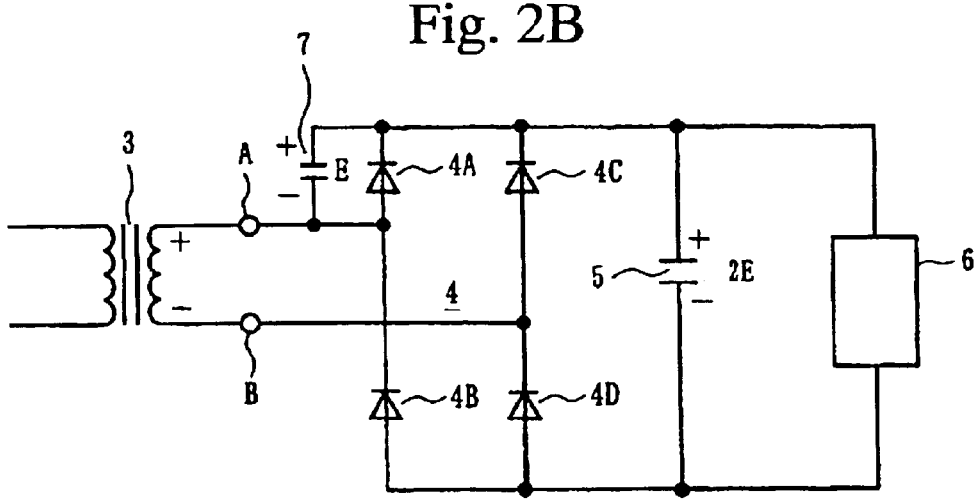
Figure 2C:
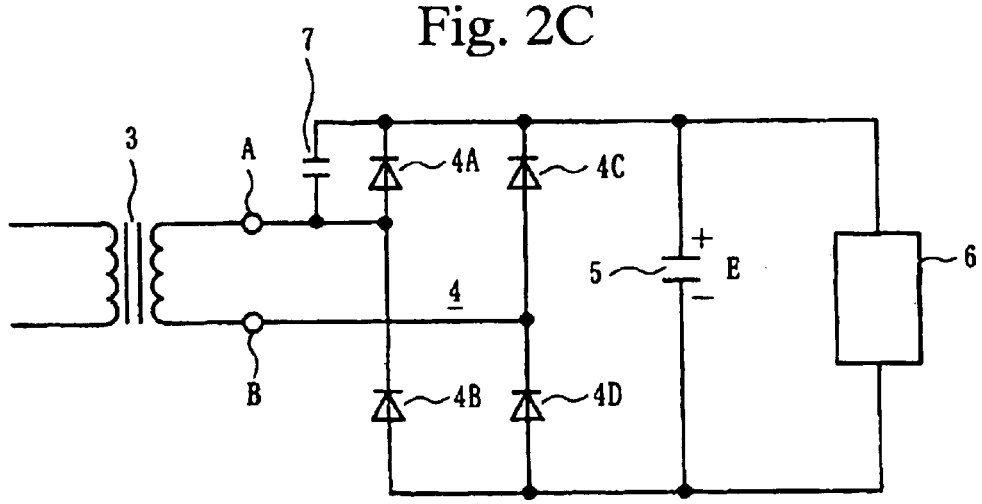

FIG. 1 is a circuit diagram showing a first embodiment of the discharge power supply apparatus of the present invention, and FIGS. 2A to 2C are circuit diagrams for explaining the operation thereof. The input side rectifier circuit 1 converts a single-phase alternating current voltage to direct current voltage by rectification, and the inverter circuit 2 converts this direct current voltage to a high frequency alternating current voltage of, for example, several kHz to several 10 kHz. The alternating current input in this example is a single-phase alternating current, but can be an alternating current having three or more phases. In this case, the rectifier 1 can be a bridge rectifier having three or more phases. The inverter circuit 2 carries out, for example, pulse width control (ON time ratio control). However, the inverter circuit 2 can be an inverter circuit that carries out control other than pulse width control, such as frequency modulation control or the like.

In the transformer 3, the high frequency alternating current voltage from the inverter circuit 2 is applied to the primary winding 3a, and an alternating current voltage is output from the secondary winding 3b that has been stepped up at a predetermined transformation ratio. In this example, a transformer is used, but in the case that the alternating current power source and the discharge load 6 do not need to be isolated from each other, the transformer can be omitted.

The alternating current voltage from the secondary winding 3b is fully rectified by the full-wave rectifier circuit 4, which acts as a bridge circuit by connecting the four diodes 4A to 4D, is then smoothed by the smoothing capacitor 5, and finally is applied to the discharge load 6. One terminal of the discharge load 6 can be grounded, as shown in the figure, and between the discharge electrodes (not illustrated), a negatively biased direct current voltage can be applied.

The trigger capacitor 7 is connected in parallel to one diode 4A among the four diodes 4A to 4D of the full-wave rectifier circuit 4. The trigger capacitor 7 can also be connected in parallel to any among the other diodes 4B, 4C, and 4D, and is not limited to just the diode 4A.

The control circuit 8 receives a voltage detection signal from the voltage detector 9, which detects the discharge voltage, and the current detection signal from the current detector 10, which detects the output current, and these are multiplied together to calculate the power value. Based on this detected power value, the control circuit 8 carries out pulse width control of the inverter circuit 2 such that the power supplied to the discharge load 6 attains a predetermined value that has been set in advance. Note that the isolation of the current detection signal and the control circuit is unnecessary if the current detector 10 carries out detection from the current on the positive electrode side, that is, the ground potential side.

The operation of the embodiment shown in FIG. 1 will be explained. As shown in FIG. 2A, in the half cycle in which a negative bias is applied to one terminal A of the secondary winding 3b and a positive bias is applied to the other terminal B, the current flows from the terminal B through the diode 4C, the trigger capacitor 7, and the terminal A, and charges the trigger capacitor 7 up to a voltage E at the illustrated polarity. During the next half cycle, a positive bias is applied to terminal A and a negative bias is applied to terminal B, and thereby, as shown in FIG. 2B, the voltage E of the trigger capacitor 7 is superimposed on the alternating current voltage E of the secondary winding 3b, and the superimposed voltage 2E is applied between the discharge electrodes (not illustrated) of the discharge load 6.

As will be explained below, a leakage current flows in an actual discharge load 6. In each cycle, the operation described above is repeated, and the trigger capacitor 7 is charged up to the alternating current voltage E of the secondary winding 3b. When the trigger capacitor 7 has been charged up to voltage E, the voltage 2E, which is the superimposition of the voltage E of the trigger capacitor 7 on the alternating current voltage of the secondary winding 3b, is applied to the discharge load 6 via the smoothing capacitor 5, and thereby the discharge of the discharge load 6 is started. During the operation in which the smoothing capacitor 5 is charged by the voltage 2E, only the diodes 4C and 4D are conducting, while the diodes 4A and 4B are substantially non-conducting. That is, the trigger capacitor 7 and the diodes 4C and 4D function as a irregular half-wave voltage doubler rectifier circuit.

Figure 3:
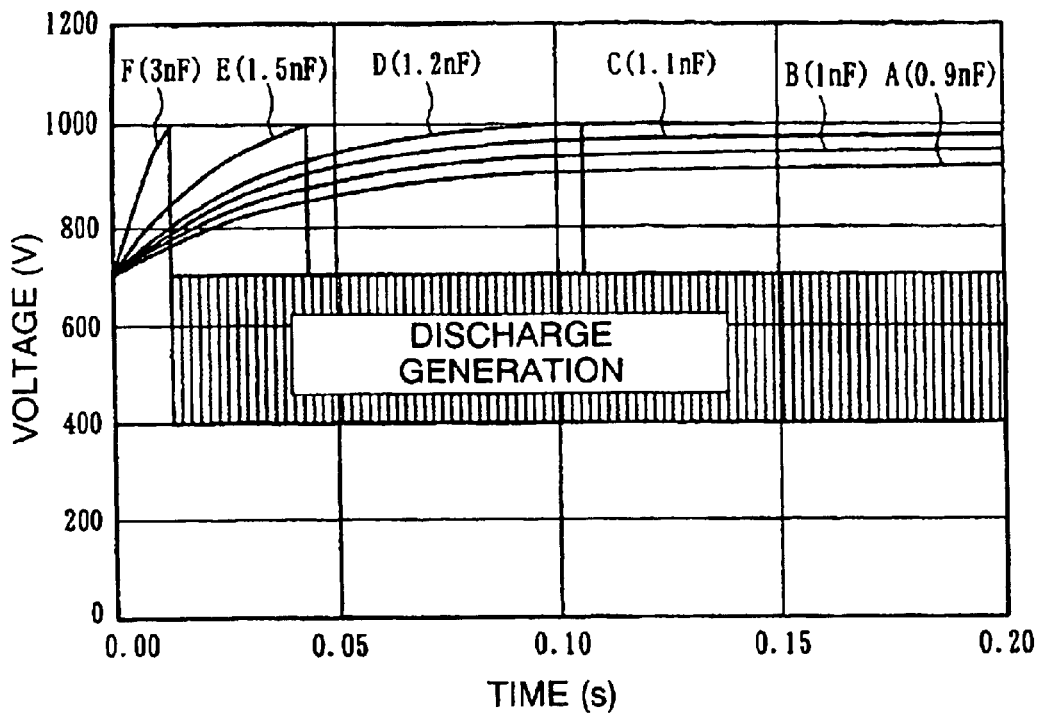
FIG. 3 is a graph showing the simulation effect.

The time period during which the trigger capacitor 7 is being charged up to voltage E is controlled by the capacitance of the trigger capacitor 7, and as shown in FIG. 3, the larger the capacitance of the trigger capacitor 7, the more quickly the charge time is completed.

The voltage 2E must have a sufficient voltage value and energy to cause a discharge between the discharge electrodes of the discharge load 6, and must be able to trigger the discharge electrodes reliably and make them attain the plasma discharge state. The gas between the discharge electrodes is ionized due to the start of the discharge. The impedance between the discharge electrodes is reduced due to the ions produced between the discharge electrodes, and thereby the discharge voltage is reduced. Therefore, the process transitions to the next half cycle while many ions are present between the discharge electrodes. If there is a capacity that can supply the current necessary for the power source to maintain the discharge, the stationary discharge can be maintained by a voltage that is small compared to the trigger voltage. When the stationary discharge state has been attained, as shown in FIG. 2C, the voltage of the discharge load 6 becomes E.

When the capacitance C of the trigger capacitor 7 is too small, it is not possible to charge the trigger capacitor 7 up to the voltage E due to the leakage current It flowing though the discharge load 6, and thus it is not possible to start the discharge between the discharge electrodes (not illustrated) of the discharge load 6. Next, the necessary electrostatic capacitance C of the trigger capacitor 7 is found.

If the leakage current of the discharge load 6 before the start of the discharge is denoted by It(A) and one cycle of high frequency alternating current voltage of the secondary winding 3b of the transformer 3 is denoted by T (seconds), then the leakage charge quantity Q(C) due to the leakage voltage It during one cycle T is Q=It×T.

When the leakage quantity Q is all discharged as the leakage current It, if the voltage value ΔV(V), which is the reduced charging voltage of the smoothing capacitor 5, is not smaller than the voltage E(V), then the charging voltage of the smoothing capacitor 5 cannot be stepped up to voltage 2E, which is double. Therefore, the formula ΔV=Q/C<E holds, and this formula becomes:

$$C > Q/E = It \times T/E = iT/(E \times F),$$

where F is the frequency (Hz) of the high frequency alternating current voltage of the secondary winding 3b of the transformer 3, that is, the converted frequency of the inverter circuit 2, and is the reciprocal of the cycle T.

As can be understood from this formula, when the capacitance C of the trigger capacitor 7 is smaller than It/(E×F), the trigger capacitor 7 does not attain the voltage E because of the influence of the leakage current It. Therefore, the trigger voltage does not rise to 2E, and thus it is difficult to make the discharge load 6 attain the discharge state. The capacitance C of the trigger capacitor 7 must be a value that satisfies the formula C>It/(E×F). However, in practice, because the power loss and the time necessary for the triggering must also be taken into account, to make the discharge load 6 attain the discharge state reliably and in a short amount of time, the capacitance C of the trigger capacitor 7 is preferably equal to or greater than 1.5 times It(E×F). If the capacitance C of the trigger capacitor 7 is made equal to or greater than 1.5 times It(E×F), the charging voltage of the trigger capacitor 7 reliably rises for each cycle of the high frequency alternating current voltage, and the discharge load 6 is triggered in a short amount of time. When the discharge load 6 is triggered and the discharge is generated at the discharge load 6, the voltage of the discharge load 6 falls, and the power is supplied to the discharge load 6 after the full-wave rectifier circuit 5 carries out a full-wave rectification.

In contrast, if the capacitance C of the trigger capacitor 7 is too high, when the discharge load 6 has attained the stationary discharge state, the time interval during which the power is supplied to the discharge load 6 through only the trigger capacitor 7, that is, the time interval during which the full-wave rectifier circuit 4 carries out half-wave voltage doubler rectification, becomes long. When the full-wave rectifier circuit 4 carries out the half-wave voltage doubler rectification, the output voltage (2E) becomes higher than that of the full-wave rectification, and thus the inverter circuit 2 shortens the pulse width, and it is operated using a short pulse width. Because the necessary discharge current flows at this short pulse width, the peak value of the current suddenly becomes large, and not only do switching semiconductor elements having a large current capacity become necessary in the inverter circuit 2, but the power loss becomes large. Therefore, preferably the capacitance C of the trigger capacitor 7 takes the necessary minimum value, where capacitance C is taken into account.

The upper value of the capacitance C is influenced by the load conditions, for example, the discharge current supplied to the discharge load 6, the gap between the discharge electrodes (not illustrated) in the discharge load 6, the degree of the vacuum and the type of gas in the atmosphere around these discharge electrodes, and thus cannot be unconditionally determined. When the load conditions for the discharge load 6 have been determined, experimentation is carried out according to these load conditions. The capacitance C of the trigger capacitor 7 is selected such that during the stationary discharge the full-wave rectifier circuit 4 transits from half-wave rectification to a full-wave rectification, and the capacitance C at this time becomes the upper value.

In this manner, if the capacitance C of the trigger capacitor 7 is larger than It/(E×F), and preferably, 1.5 times larger than It/(E×F), then it is possible to trigger the discharge load 6 reliably. However, although a ripple voltage during stationary discharge becomes large because the energy charged to the trigger capacitor 7 moves to the smoothing capacitor 5 each cycle even after the start of the stationary discharge, this energy does not become a useless power loss because it is used as discharge energy. Note that the capacitance C of the trigger capacitor 7 is taken into account, and is not limited to this range. Ultimately, the range should be determined by experiment.

Based on the conception described above, design was carried out, and the simulated results are shown in FIG. 3. The conditions are as follows:

(1) the stationary discharge voltage Eo=500V
(2) the discharge current Io during stationary discharge=20 A (where the load resistance is 25Ω)
(3) the trigger voltage Vt=1000V
(4) the leakage current It before triggering=10 mA (where the load resistance is 100 kΩ)
(5) the effective value Vo of the output voltage of the high frequency power source=260V
(6) the transformation ratio n of the transformer=2.

Argon (Ar) gas is used in the atmosphere around the discharge electrodes (not illustrated) of the discharge load 6 to generate a plasma discharge. In the simulation, the inverter circuit 2 was replaced with a high frequency alternating current power source having an effective value of 260V. As the discharge load 6, before triggering the discharge, a 100 kΩ load resistance that simulates the current load is connected and a leakage current is caused to flow. After start-up, when the load voltage reaches 1000V, triggering occurs, and the load resistance is switched by a switch to a 25Ω resistance that simulates a plasma discharge load.

By the above equation, the minimum capacitance C of the trigger capacitor 7 is C=It/(E×F)=0.1/(500×20³)=1 nF, and thus simulations were carried out for the cases of 0.9 nF, which is a smaller capacity than the minimum capacity, 1 nF, which is the minimum capacity, and 1.1 nF, 1.2 nF, 1.5 nF, and 3 nF.

The results of these simulations are shown, in order, by the respective curves A to F. In the case of the curve A (0.9 nF), the charging voltage of the trigger capacitor 7 does not attain 500V, and thus the necessary trigger voltage (1000V) is not attained, and the discharge load 6 is not triggered. In the case of curve B and curve C, although not illustrated, 1000V is attained after a long period of time. However, in an actual apparatus, it is difficult to select such capacities.

In the case that the capacity of the trigger capacitor 7 is 1.2 nF (curve D), in a comparatively short time, the trigger voltage rises to 1000V, and after start-up, the trigger capacitor 7 is triggered in about 110 ms, and transits to the plasma discharge. In the case that the capacitance C of the trigger capacitor 7 is 1.5 nf (curve E), the trigger voltage rises to 1000V in an even shorter period of time, the trigger capacitor 7 is triggered in about 40 ms, and transits to a plasma discharge. In the case that the capacitance C of the trigger capacitor 7 is 3 nF (curve F), the trigger voltage rises to 1000V is an even shorter period of time, the trigger capacitor 7 is triggered in about 20 ms, and transits to a plasma discharge. In FIG. 3, the hatched area (width), which shows the discharge generation, illustrates the ripple voltage of the discharge voltage.

Figure 4:
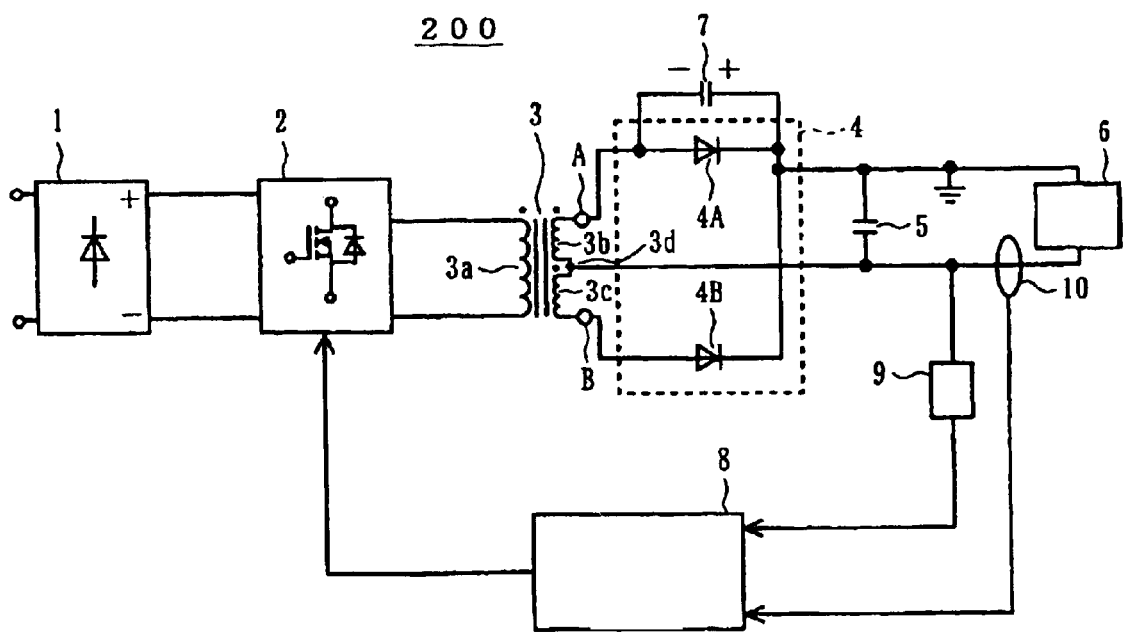
FIG. 4 to FIG. 12 are circuit diagrams showing other differing embodiments of the present invention.

FIG. 4 shows a second embodiment of the present invention. In FIG. 1, a full-bridge rectifier circuit is used as a full-wave rectifier circuit 4, whereas in this embodiment, a center tapped rectifier circuit is used. In FIG. 4, elements that are identical to those in FIG. 1 are denoted by identical reference symbols and their explanation is omitted.

The transformer 3 provides a secondary winding 3b and a secondary winding 3c connected serially. Between the secondary windings 3b and 3c, a center point 3d is provided as the center tap. The terminals A and B of the secondary windings 3b and 3c are respectively serially connected to the diodes 4A and 4B, and thereby a center tap full-wave rectifier circuit 4 is formed. The full-wave rectifier circuit 4 carries out operations that are identical to the first embodiment.

One diode 4A and the trigger capacitor 7 are connected in parallel. Instead of the diode 4A, the diode 4B and the trigger capacitor 7 can be connected in parallel. If the voltages generated by the secondary windings 3b and 3c are denoted by E, then when a negative bias is applied to the terminal A and a positive bias is applied to the terminal B, the trigger capacitor 7 is charged up to at a voltage 2E. Next, when a positive bias is applied to the terminal A and a negative bias is applied to the terminal B, the voltage E(V) of the secondary winding 3b is superimposed on the charging voltage 2E of the trigger capacitor 7, the 3E(V) trigger voltage is applied to the discharge load 6 via the smoothing capacitor 5, and the discharge load is triggered. Therefore, the circuit in this embodiment is applied when a trigger voltage that is rather high in comparison to the stationary discharge voltage is necessary.

Figure 5:
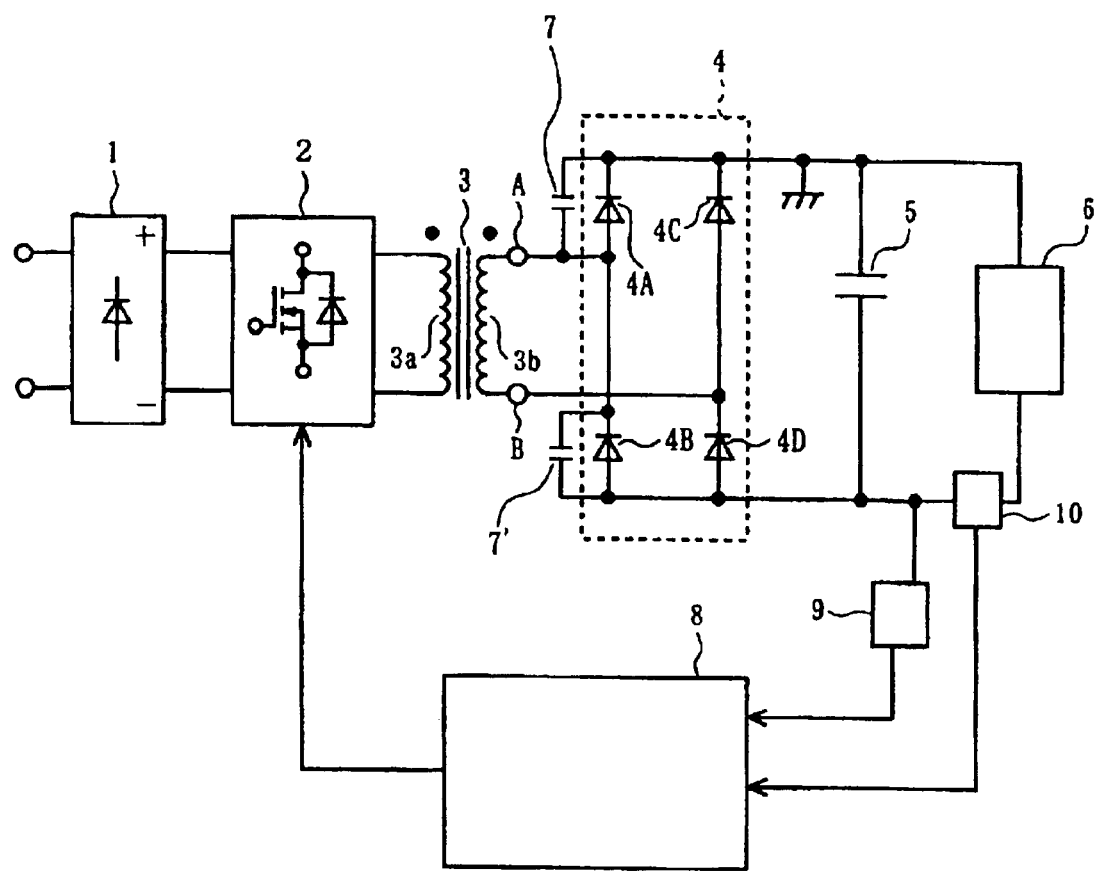

FIG. 5 shows a third embodiment of the present invention. In FIG. 1, a portion of the diodes, which are bridge connected to form the full-wave rectifier circuit 4, is connected to the trigger capacitor 7. In contrast, as shown in FIG. 5, in this discharge power supply apparatus, among the two rows of diodes that form the bridge circuit of the full-wave rectifier circuit 4, the diodes 4A and 4B, connected serially, are respectively connected to the trigger capacitors 7 and 7'. In FIG. 5, the elements identical to those in FIG. 1 are denoted by identical reference symbols, and their explanation is omitted.

The operation of this discharge power supply apparatus will be explained. During the half-cycle when a positive bias is applied to the terminal B and a negative bias is applied to the terminal A, the high frequency alternating current voltage E of the secondary winding 3b charges the trigger capacitor 7 by passing through the diode 4C from the terminal B. Next, during the half-cycle when a positive bias is applied to the terminal A and a negative bias is applied to the terminal B, the high frequency alternating current voltage E of the secondary winding 3b flows through the trigger capacitor 7' and the diode 4D, and the trigger capacitor 7' is charged. This operation is repeated. When either the trigger capacitor 7 or the trigger capacitor 7' has been charged up to a voltage equal to the alternating current voltage E of the secondary winding 3b, the voltage 2E is applied to the discharge load 6 via the smoothing capacitor 5, and the discharge load 6 is triggered and attains the stationary discharge state.

In this discharge power supply apparatus, only the diodes 4C and 4D are conductive in each cycle before the trigger, and diodes 4A and 4B are substantially non-conductive. This means that the trigger capacitors 7 and 7' and the diodes 4C and 4D form the full-wave voltage doubler circuit. Because a voltage doubler operation is carried out at the two trigger capacitors 7 and 7', in principle the capacitance C of these capacitors can be one-half the capacitance C (C>It/(2×E×F)) of the discharge power supply apparatus in FIG. 1.

Figure 6:
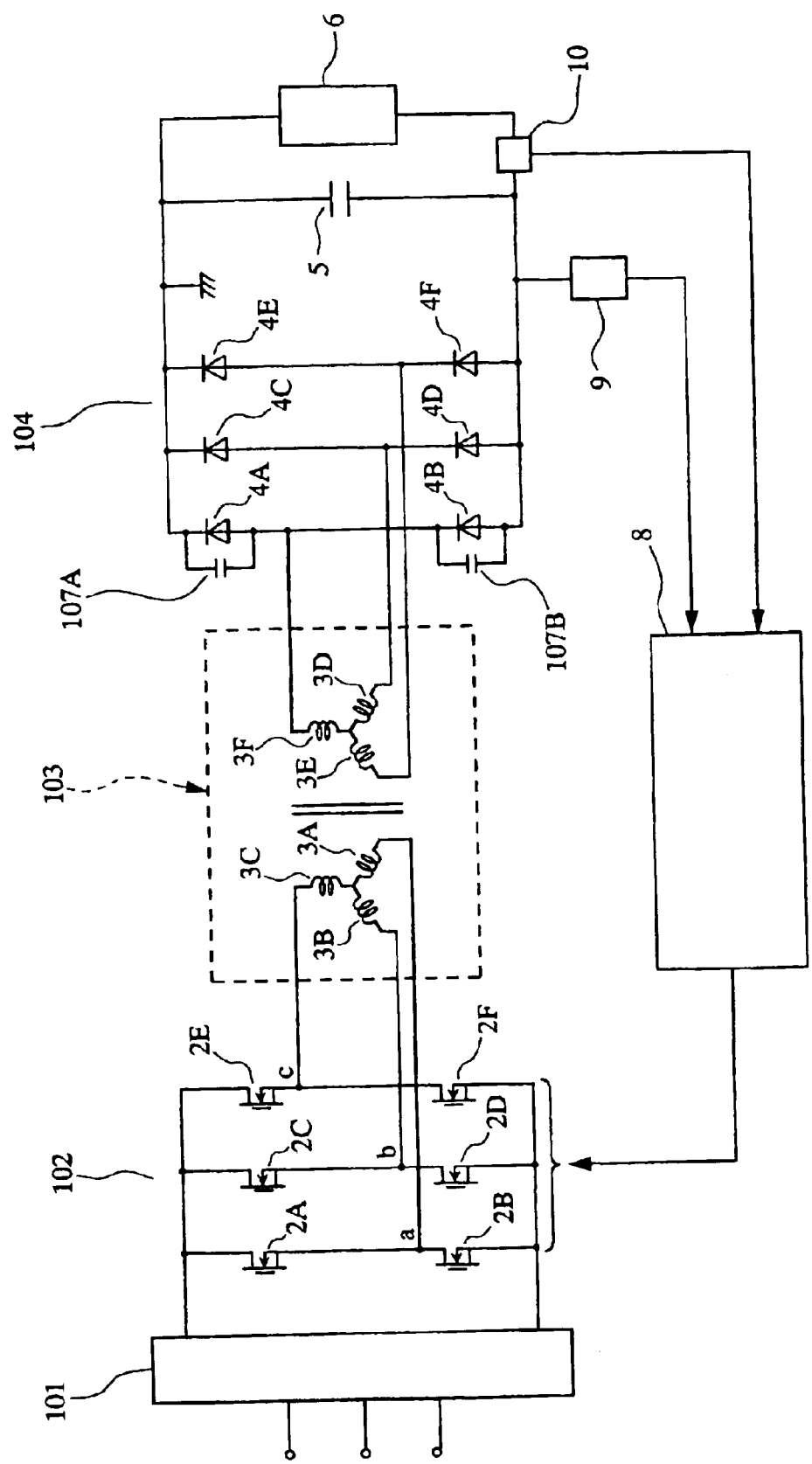

FIG. 6 is another embodiment of the present invention. In this embodiment, a three-phase rectifier 101 is used as the input rectifier. The output of the three-phase rectifier 101 is supplied to a three-phase inverter 102, and the output from the three-phase inverter 102 is supplied to the three-phase transformer 103. The output of the three-phase transformer 103 is supplied to the three-phase full-wave rectifier circuit 104 to be full-wave rectified.

The three-phase inverter in this example consists of six MOSFETs 2A to 2F. The three-phase transformer 103 consists of the three star connected primary windings 3A, 3B, and 3C and three star connected secondary windings 3D, 3E, and 3F. The three-phase bridge rectifier circuit 104 consists of the six diodes 4A to 4F. The three-phase inverter 102 produces alternating current voltages that have a 120° phase difference on the three alternating current output lines a, b, and c. The alternating current voltages are rectified by the three-phase bridge rectifier circuit 104 after being transformed by the transformer 103. In this three-phase method, the ripples in the output direct current voltage can be reduced in comparison to the embodiment (single phase method) in FIG. 1.

The detailed explanations of the three-phase discharge power transformation apparatus consisting of the three-phase inverter 102, three-phase transformer 103, and the three-phase bridge rectifier circuit 104 are omitted. The control circuit 108, the voltage detecting circuit 109, and the current detecting circuit 110 correspond respectively to the elements 8, 9, and 10 in the explanation for FIG. 1.

In this embodiment, among the three rows of diodes that form the three-phase bridge rectifier circuit 104, the trigger capacitors 107A and 107B are connected to the serially connected diodes 4A and 4B. By adding the trigger capacitors 107A and 107B, it is possible to generate a voltage that is higher than the stationary voltage before starting the discharge. Diodes 4C and 4D or 4E and 4F can be connected instead of the diodes 4A and 4B. It is also possible to connect the capacitor to only one diode among these six diodes. Moreover, various inductances and capacitances can be connected serially to the three alternating current output lines a, b, and c of the three-phase inverter 102 to form what is called a series resonant inverter, and frequency modulation control can be carried out.

Figure 7:
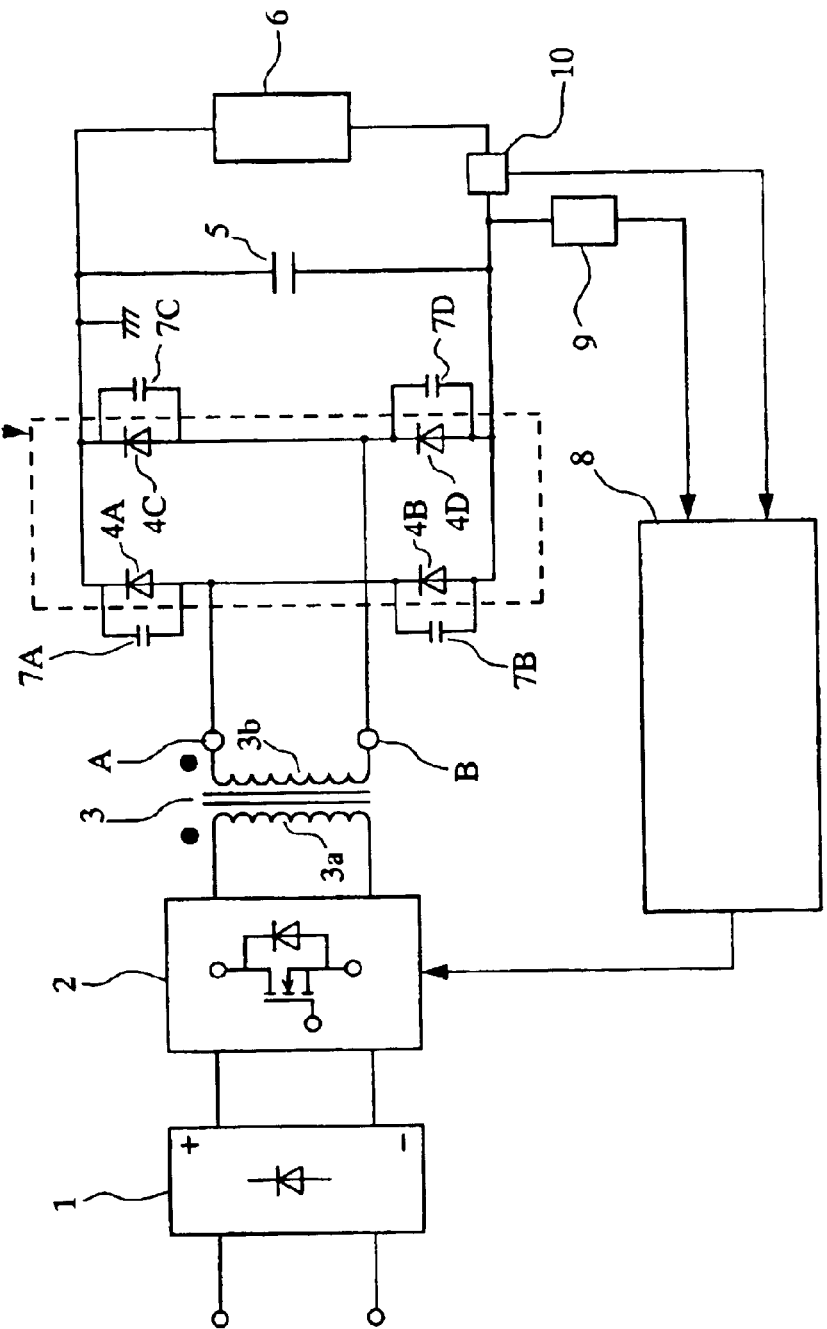

FIG. 7 shows another embodiment of the present invention. In this embodiment, all four diodes 4A to 4D are connected in parallel to the respective capacitors 7A to 7D. If all the capacitors 7A to 7D have a substantially identical capacitance, the capacitors of this circuit configuration can suppress surge voltages applied to the diodes 4A to 4D and reduce the recovery noise in the diodes 4A to 4D.

However, in this embodiment, the output voltage before starting the discharge can be made higher than the stationary discharge voltage by making the electrostatic capacitance of the two capacitors 7A and 7B that are connected in parallel to one of the rows consisting of diodes 4A and 4B (4C and 4D can also be used) larger than the remaining capacitors 7C and 7D.

Like the embodiments shown in FIG. 1 and FIG. 5, the voltage generation principle of the embodiment in FIG. 7 is voltage doubler rectification. Taking into account the appropriate electrostatic capacitance corresponding to the leakage current is complicated due to the presence of the capacitors 7C and 7D, and thus cannot be adequately clarified. However, the difference between the electrostatic capacitance of the capacitors 7A, 7A', 7B, and 7B' and the electrostatic capacitance of the capacitors 7C, 7C', 7D, and 7D' can be selected by the following formula, which takes into account the electrostatic capacitance C:

$$C=It/(2\times E\times F)$$

The reason that the coefficient 2 is entered in the denominator is that, like the conception of the embodiment in FIG. 5, the capacitors 7A and 7B parallel to the two diodes 4A and 4B are provided a trigger capacitor function. When only the capacitor 7A is made larger than the other capacitors 7B, 7C, and 7D, like the embodiment in FIG. 1, this difference becomes the electrostatic capacitance represented by the following formula:

$$C=It/(E\times F)$$

Concretely, the capacitance of the capacitors is selected under conditions that are identical to the previous simulation conditions. For example, if the electrostatic capacitance of the capacitors 7C and 7D is 1 nF, preferably the electrostatic capacitance of the capacitors 7A and 7B is equal to or greater than 5 nF. A capacitor is connected only to the one diode D1.

Figure 8:
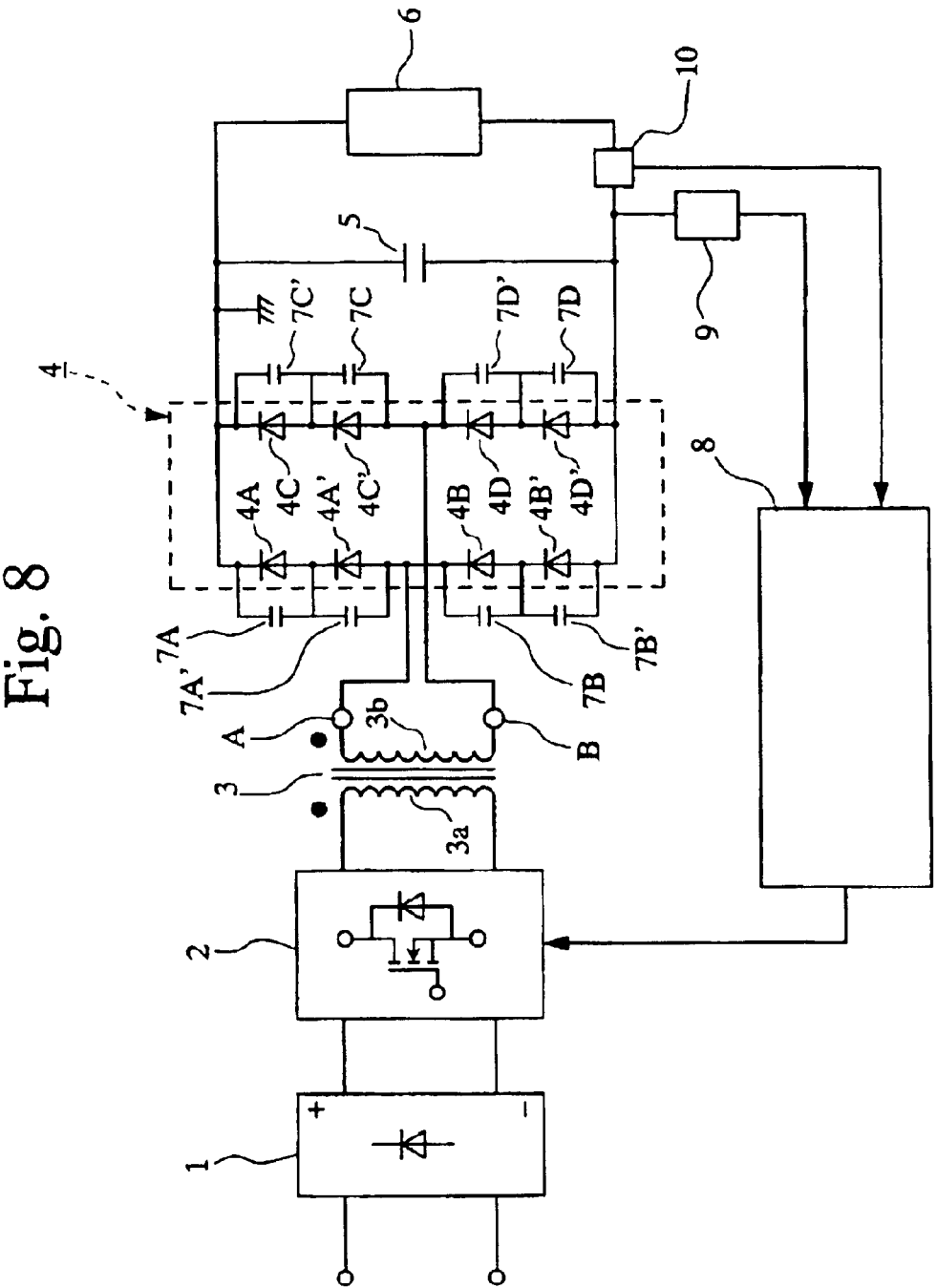

FIG. 8 shows another embodiment of the present invention. In this embodiment, a total of four diodes of the full-wave rectifier circuit 4 are replaced by the serially connected pairs of diodes 4A and 4A', 4B and 4B', 4C and 4C', and 4D and 4D'. The capacitors 7A to 7D' are respectively connected in parallel to all the diodes 4A to 4D'.

If the capacitors all have substantially identical electrostatic capacities, each of the capacitors acts as a capacitor that balances the excess voltage of the serial diodes. However, in the present invention, the output voltage before the start of the discharge can be made higher than the rated discharge voltage by making the electrostatic capacitance of the two capacitors 7A, 7A', 7B, 7B' that are connected together serially and connected to the diodes 4A and 4A', and 4B and 4B' in only one serial arm in parallel substantially larger than the remaining capacitors 7C, 7C', 7D, and 7D'.

The voltage generating principle of the example in FIG. 8 is the voltage doubler rectification identical to the embodiments in FIG. 1, FIG. 5, and FIG. 7, but taking into account the appropriate electrostatic capacitance corresponding to the leakage current is complicated due to the presence of the capacitors 7C, 7C', 7D, and 7D', and thus cannot be adequately clarified. However, the difference between the serial electrostatic capacitance of the capacitors 7A and 7A', and the serial electrostatic capacitance of the capacitors 7B and 7B', and the serial electrostatic capacitance of the remaining capacitors 7C and 7C' and the serial electrostatic capacitance of the capacitors 7D and 7D' can be selected by the following formula, which takes into account the electrostatic capacitance C(F):

$$C=It/(2\times E\times F)$$

The reason that the coefficient 2 is entered in the denominator is that, like the conception of the embodiment in FIG. 5, two trigger capacitors are used. When only the capacitors 7A and 7A' are made larger than the other capacitors 7B, 7B', 7C, 7C', 7D, and 7D', this difference becomes the electrostatic capacitance C represented by the following formula:

$$C=It/(E\times F)$$

Concretely, the capacitance of the capacitors is selected under conditions that are identical to the previous simulation conditions. For example, when the electrostatic capacitance of the capacitors 7C, 7C', 7D, and 7D' is 2 nF, preferably the electrostatic capacitance of the capacitors 7A, 7A', 7B, and 7B' is equal to or greater than 4 nF. The capacitors 7A and 7A', which have a larger electrostatic capacitance than the others, can be connected to only the group of diodes 4A and 4A'.

In each of the embodiments described above, the smoothing capacitor 5 is connected in parallel to the discharge load 6, but the smoothing capacitor 5 can be eliminated in order to make the discharge energy during an arc discharge small.

In addition, the inverter can be formed by IGBTs or bipolar transistors, not only MOSFETs, and the bridge inverter is not limited.

Figure 9:
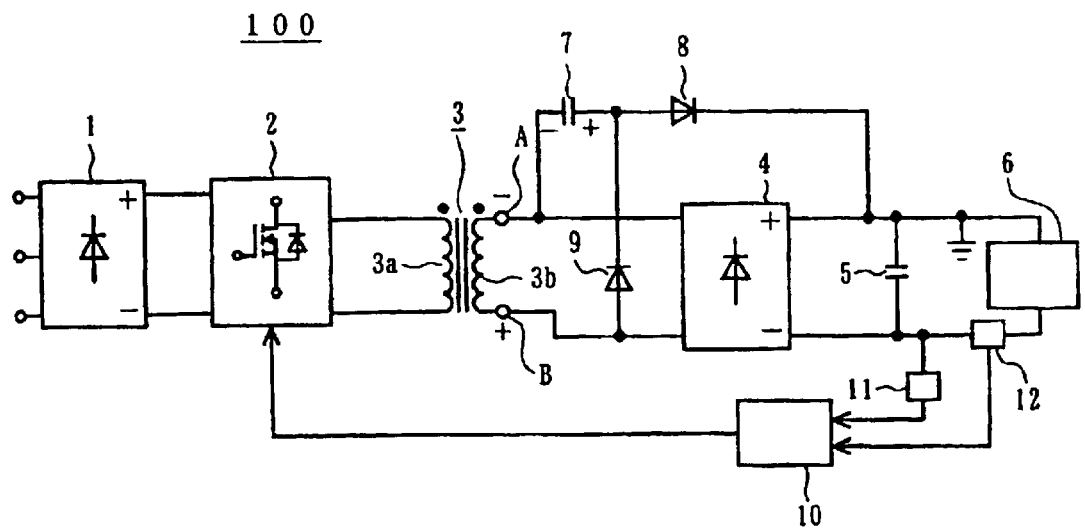

FIG. 9 shows another embodiment, and the operation thereof is identical to that explained using FIG. 3. After the three-phase alternating current voltage is rectified and converted to direct current power by the input side rectifier circuit 1, the inverter circuit 2 converts this direct current voltage to a high frequency alternating current voltage of several kHz to several 10 kHz. The inverter circuit 2 is well known, and for example, and may be pulse width controlled (ON time ratio controlled). The transformer 3 inputs at the primary winding 3a the high frequency alternating current voltage output from the inverter circuit 2 applied. This alternating current voltage is stepped up at a predetermined transformation ratio and output from the secondary winding 3b. The alternating current voltage of the secondary winding 3b is full-wave rectified by the full-wave rectifier circuit 4, which has four diodes connected to a bridge (not illustrated), smoothed by the smoothing capacitor 5, and applied to the discharge load 6. The discharge load 6 normally has one terminal grounded, and a negatively biased direct current voltage is applied between the discharge electrodes (not illustrated).

Between the input side of the full-wave rectifier circuit 4 (that is, the junction between one of the outputs of the full-wave rectifier circuit 4 and the one terminal A of the secondary winding 3b of the transformer 3) and the output side of the full-wave rectifier circuit 4 (that is, the junction between the output of the full-wave rectifier circuit 4 and the discharge load 6), a circuit in which the trigger capacitor 7 and the trigger diode 8 are connected serially is connected across the full-wave rectifier circuit 4. A charging diode 9 for charging the trigger capacitor 7 is connected between the other output side of the full-wave rectifier circuit 4 (that is, the junction between the other input of the full-wave rectifier circuit 4 and the other terminal B of the secondary winding 3b of the transformer 3) and the junction of the trigger capacitor 7 and the trigger diode 8.

The control circuit 10 receives the voltage detection signal and the current detection signal respectively from the voltage detector 11 that detects the load voltage and the current detector 12 that detects the output current, and carries out pulse control of the inverter circuit 2 such that the power supplied to the discharge load 6 becomes a predetermined value.

During the half cycle in which a negatively biased voltage is applied to the one terminal A of the secondary winding 3b and a positively biased voltage is applied to the other terminal B, the current flows from the terminal B through the charging diode 9, the trigger capacitor 7, and the terminal A, and charges the trigger capacitor 7 with the illustrated polarity. During the next half cycle, a positively biased voltage is applied to the terminal A and a negatively biased voltage is applied to the terminal B, and thereby the voltage of the trigger capacitor 7 is superimposed on the alternating current voltage E of the secondary winding 3b, and this superimposed voltage is applied between the discharge electrodes (not illustrated) of the discharge load 6.

As will be described below, because a leakage current It flows in an actual discharge load, the trigger capacitor 7 cannot attain the alternating current voltage E in each cycle, but the trigger capacitor 7 is gradually charged up to the alternating current voltage E of the secondary winding 3b by repeating the operation as described above in each cycle. When the trigger capacitor 7 has been charged up to the voltage E, the voltage 2E, which is the voltage of the trigger capacitor 7 superimposed on the alternating current voltage E of the secondary winding 3b, is applied to the discharge load 6 after passing through the smoothing capacitor 5, and the discharge load 6 is triggered. The full-wave rectifier circuit 4 carries out a full-wave rectification to supply the discharge power.

The time during which the trigger capacitor 7 is charged up to the voltage E is determined by the size of the capacitance of the trigger capacitor 7, and as shown in FIG. 3, the larger the capacitance of the trigger capacitor 7, the more quickly the charging time is completed.

The voltage 2E has a sufficient voltage value and energy to cause the discharge between the discharge electrodes (not illustrated) of the discharge load 6, and must cause the discharge electrodes to attain the discharge state reliably. Due to the starting of this discharge, the gas between the discharge electrodes is ionized, the impendence between the discharge electrodes is reduced, and this discharge voltage becomes small. Therefore, the process proceeds to the next cycle while many ions are present between the discharge electrodes, and if there is a capacity in which the voltage necessary for the power source to maintain the discharge can be supplied, the stationary discharge can be maintained at a voltage that is small compared to the trigger voltage.

When the capacitance C of the trigger capacitor 7 is too small, it is not possible to charge the trigger capacitor 7 up to the voltage E due to the leakage voltage It flowing through the discharge load 6, and thus it is not possible to start the discharge between the discharge electrodes (not illustrated) of the discharge load 6. Next, in order to generate the voltage 2E, which is double the winding voltage, the minimum necessary capacitance C of the trigger capacitor 7 must be found.

If the leakage current of the discharge load 6 before starting the discharge denoted It and one cycle of the high frequency alternating current voltage of the secondary winding 3b of the transformer 3 is denoted T, then the leakage charge quantity Q due to the leakage current It in one cycle T is $Q=It \times T$.

If the charge quantity Q has all been discharged as leakage current It, when the voltage value $\Delta V$, which is the reduced charging voltage of the smoothing capacitor 5, is not smaller than the voltage E, the charging voltage of the smoothing capacitor 5 cannot rise to the voltage 2E, which is double. Therefore, the formula $\Delta V=Q/C<E$ holds, and this formula becomes $C>Q/E=It \times T/E=It/(E \times F)$, where F denotes the frequency of the high frequency alternating current voltage of the secondary winding 3b of the transformer 3, that is, the conversion frequency of the inverter circuit 2, and is the reciprocal of the cycle T.

taken into consideration, and therefore, to make the discharge load 6 attain the discharge state reliably and in a short time, the capacitance C of the trigger capacitor 7 is preferably 1.5 times or greater than $It/(E \times F)$. The charging voltage of the trigger capacitor 7 will reliably rise during each cycle of the high frequency alternating current voltage due to selecting a value that is 1.5 times or greater than $It/(E \times F)$, and the discharge load 6 can be triggered in a short period of time.

In contrast, when the capacitance C of the trigger capacitor 7 is too large, the discharge load 6 attains the stationary discharge state and the full-wave rectifier circuit 4 carries out the full-wave rectification. When the power is supplied to the discharge load 6, the power is supplied to the discharge load 6 via only the trigger capacitor 7. This means that a time period occurs during which the full-wave rectifier circuit 4 is carrying out a half-wave rectification. When the full-wave rectifier circuit 4 carries out a half-wave rectification, naturally the conduction period becomes short, and thus the inverter circuit 2 limits the pulse width, and operates at a short pulse width. Because the necessary discharge current flows at a short pulse width, the peak value of the current becomes high, and not only does a switching semiconductor element having a large current capacity become necessary in the inverter circuit 2, but the power loss becomes large. Therefore, the capacitance C of the trigger capacitor 7 is preferably smaller than the maximum capacitance Cu at which the diodes 4A to 4D of the full-wave rectifier circuit 4 are not cut off, that is, the full-wave rectifier circuit does not transit from a full-wave rectification to a half-wave rectification.

The maximum capacitance of the trigger capacitor 7 is influenced by the load conditions, for example, the discharge current supplied to the discharge load 6, the gap between the discharge electrodes (not illustrated) in the discharge load 6, the degree of the vacuum and the type of gas in the atmosphere around these discharge electrodes, and the like, and therefore cannot be determined unconditionally. Experiments that depend on the load conditions are carried out, and the capacitance C of the trigger capacitor 7 at the time that the full-wave rectifier circuit 4 transits from full-wave rectification to half-wave rectification is made the maximum capacitance.

In this manner, in the case that the capacitance C of the trigger capacitor 7 is larger than $It/(E \times F)$, preferably 1.5 times larger, and at the same time smaller than the maximum capacitance Cu, the discharge load 6 can be reliably triggered. Although the discharge load 6 can be reliably triggered, after the start of the stationary discharge the energy that has charged the trigger capacitor 7 moves to the smoothing capacitor 5 in each cycle, and thus the ripple voltage during stationary discharge becomes large. However, this energy is used as discharge energy, and thus does not constitute useless energy loss.

Design is carried out based on the concept described above, and the results of simulation are as shown in FIG. 3. The conditions are as follows:
(1) the stationary discharge voltage Eo=500V
(2) the discharge current Io during stationary discharge=20 A (with a load resistance of 25Ω)
(3) the trigger voltage Vt=1000V
(4) the leakage voltage It before triggering=10 mA (with a load resistance of 100 kΩ)
(5) the effective value Vo of the output voltage of the high frequency power source=260V
(6) the transformation ratio n of the transformer 3=2

A plasma discharge is generated using argon (Ar) gas in the atmosphere around the discharge electrodes (not illustrated) in the discharge load 6. In the simulation, the inverter circuit 2 was replaced by a high frequency alternating current power source having an effective value of 260V. As the discharge load 6, before triggering the discharge, a 100 kΩ load resistance that simulates the current load is connected and a leakage current is caused to flow. After start-up, when the load voltage reaches 1000V, triggering occurs, and the load resistance is switched by a switch to a 25Ω resistance that simulates a plasma discharge load.

According to the following formula, the minimum capacitance C of the trigger capacitor 7 is:

$$C = It/(E \times F) = 0.01/(500 \times 20^3) = 1 \ nF$$

Thus a simulation was carried out for the cases of 0.9 nF, where the capacitance is smaller than the minimum capacitance; 1.0 nF, in which the minimum capacitance; a slightly larger 1.1 nF; and further for 1.2 nF, 1.5 nF, and 3 nF.

The results of the simulation are respectively shown in the sequence of curves A to F. In the case of curve A (0.9 nF), the charging voltage of the trigger capacitor 7 does not attain 500V, the necessary trigger voltage (1000V) is not attained, and thus the discharge load 6 is not triggered. In the case of curve B (1.0 nF) and curve C (1.1 nF), although not illustrated, a long time is required to attain 1000V. However, because the time up to discharge is too long, in an actual apparatus, selection of this type of voltage is difficult.

In the case that the capacitance of the trigger capacitor 7 is 1.2 nF (curve D), the trigger voltage rises up to a voltage of 1000V in a comparatively short time, triggering occurs in about 10 ms, and there is a transition to a plasma discharge. It can be understood that when the capacitance C of the trigger capacitor 7 is 1.5 nF (curve E), the trigger voltage rises up to 1000V in an even shorter time, triggering occurs in about 40 nm, and there is a transition to a plasma discharge. In the case that the capacitance C of the trigger capacitor 7 is 3 nF (curve F), it can be understood that the trigger voltage rises up to 1000V in an even shorter time, triggering occurs in about 20 ms, and there is a transition to a plasma discharge. Although not illustrated, a capacitance C of the trigger capacitor 7 up to 2000 nF was simulated, and the plasma discharge was generated in an even shorter required time.

Figure 10:
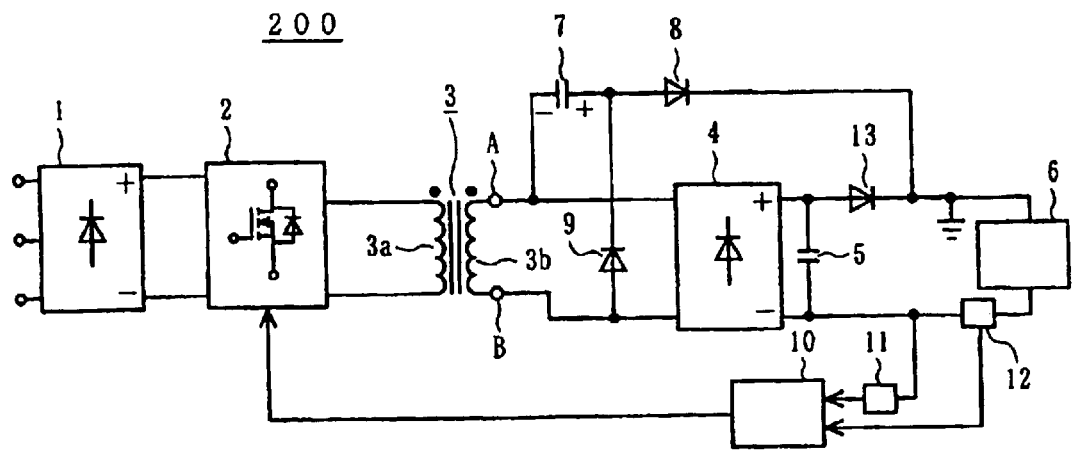

FIG. 10 shows a discharge power supply apparatus of another embodiment. In FIG. 10, the reference symbols that are identical to those used in FIG. 9 denote names of the elements that are identical to the elements in FIG. 9.

This embodiment differs from the discharge power supply apparatus shown in FIG. 9 on the point that a bypass diode 13 is serially connected between the smoothing capacitor 5 and the discharge load 6, and at the same time, the cathode of the bypass trigger 13 is connected to the cathode of the trigger diode 8.

By providing a bypass diode 13 in this manner, the trigger voltage 2E is not smoothed by the smoothing capacitor 5, and the trigger voltage 2E is directly applied to the discharge load 6. Thereby, the discharge load 6 is triggered quickly. When the discharge load 6 is triggered and a discharge state is attained, the discharge power is supplied to the discharge load 6 from the secondary winding 3b of the transformer 3 through the full-wave rectifier circuit 4, the smoothing capacitor 5, and the bypass diode 13. According to this embodiment, the readiness is improved.

In addition, the output voltage of the full-wave rectifier circuit 4 is blocked by the trigger voltage 2E due to the bypass diode 13, and only the voltage E is applied. Thus, there is the advantage that the breakdown voltage of the diodes that form the full-wave rectifier circuit 4 and the breakdown voltage of the smoothing capacitors 5 can be one-half in comparison to the discharge power supply apparatus 100 in FIG. 9.

Figure 11:
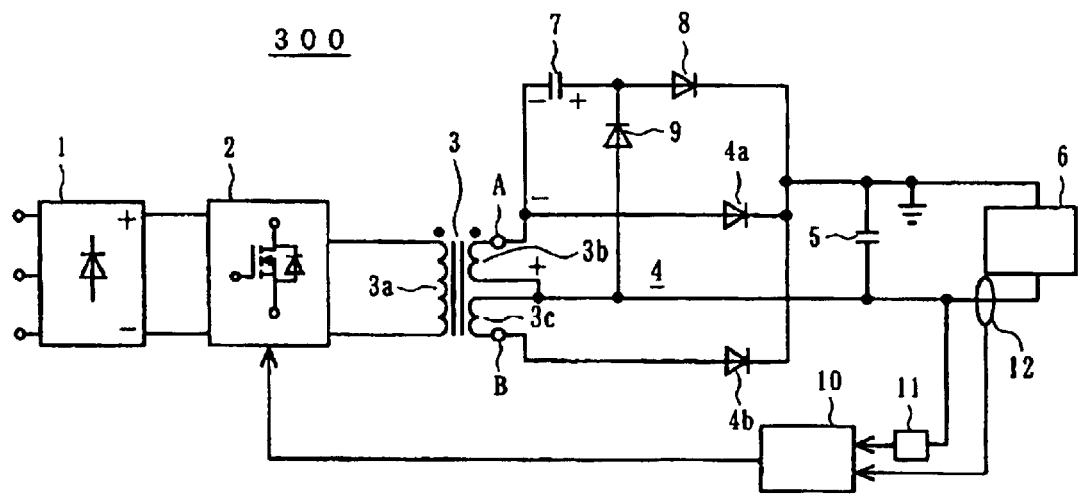

FIG. 11 shows a discharge power supply apparatus of another embodiment. In FIG. 11, the reference symbols identical to those in FIG. 9 denote parts having names identical to those in FIG. 9.

In the transformer 3, a secondary winding 3c is added serially to the secondary winding 3b, and the secondary windings 3b and 3c have a center tap structure having the center 3d. The anodes of the diodes 4A and 4B are respectively connected serially to the terminals A and B of the secondary winding 3c that has been added to the secondary winding 3b, and the cathodes are connected together to form the center tap full-wave rectifier circuit 4.

The circuit in which the trigger capacitor 7 and the trigger diode 8 are connected serially is connected between the terminal A of the secondary winding 3b and the cathodes of the diodes 4A and 4B. The charging diode 9 for charging the trigger capacitor 7 is connected between the junction of the trigger capacitor 7 and the trigger diode 8, and the center point 3d. The operation of this discharge power supply apparatus is substantially identical to the operation of the discharge power supply apparatus es 100 and 200, and the explanation thereof is omitted.

Figure 12:
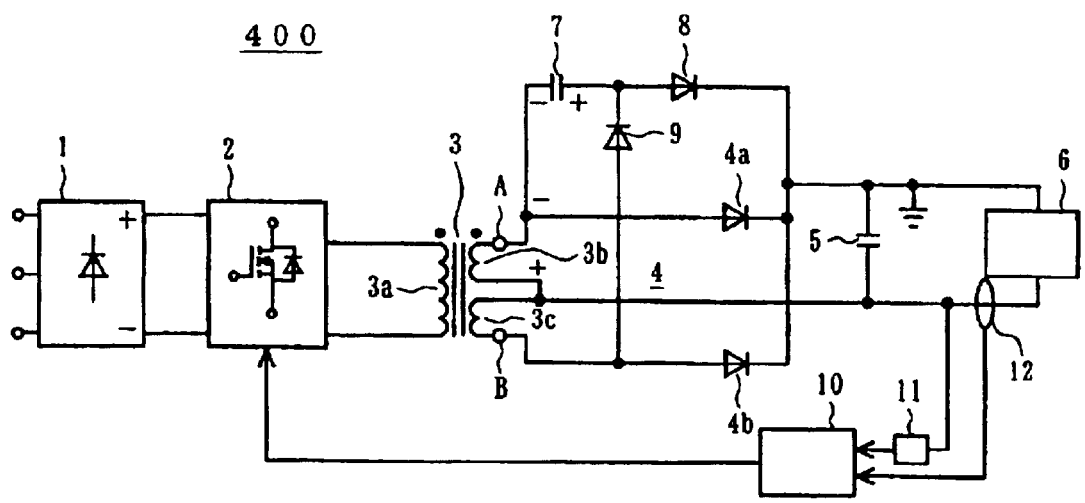
Figure 13:
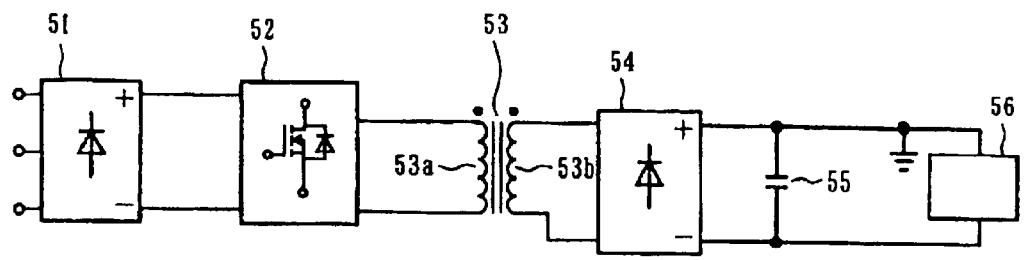
FIG. 13 and FIG. 14 are circuit diagrams showing examples of a conventional discharge power supply apparatus.
Figure 14:
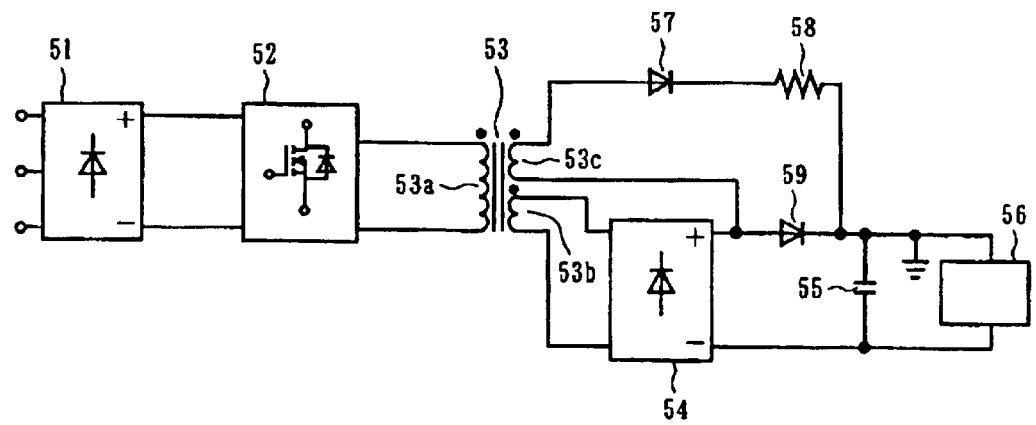

FIG. 12 shows yet another embodiment. In FIG. 12, the reference symbols identical to those in FIG. 9 denote parts having names identical to those in FIG. 9. This embodiment differs from the discharge power supply apparatus shown in FIG. 9 on the point that the anode of the charging diode 8 is connected to terminal B of the added secondary winding 3c.

The operation of the discharge power supply apparatus 400 will be explained. During the cycle in which a negative bias is applied to the terminal A of the secondary winding 3b and a positive bias is applied to the terminal B of the added secondary winding 3c, voltage 2E, which is the superimposition of the voltage E of the secondary winding 3b and the voltage E of the added secondary winding 3c, is applied to the trigger capacitor 7 through the charging diode 9, and the trigger capacitor 7 is charged up to voltage 2E. Therefore, according to the discharge power supply apparatus 400, as can be understood from the previous explanation, the voltage 3E is applied to the discharge load 6.

According to this embodiment, if the trigger voltage of the discharge load 6 is the voltage 2E, when the trigger capacitor 7 is charged to the voltage E, the voltage 2E is applied to the discharge load 6, and it is triggered. Thus, it is possible to start the discharge of the discharge load 6 in a short time. In addition, the trigger voltage can be applied up to 3E. Furthermore, in this embodiment, if the number of windings of the secondary winding 3c is increased in comparison to the number of windings of the secondary winding 3b to correspond to the necessary voltage, this embodiment can be applied to a discharge load having a trigger voltage that is higher than 3E.

The smoothing capacitor 5 connected in parallel to the discharge load 6 is for decreasing the discharge energy when the discharge load 6 is in an arc discharge state, and can be omitted.

The uses of the present invention are, for example, a power source for triggering a laser tube in a laser apparatus such as an excimer laser; an electrical light apparatus for igniting various types of electrical light such as a high intensity discharge (HID) lighting; a discharge power supply apparatus for optical fiber fusion connection wherein, when the cross-sectional faces of optical fibers are abutted in order to be connected, the optical fibers are fused by heat generated by a discharge; and a thin film formation apparatus in which a plasma gas is ionized by generating a plasma discharge, these ions bombard the target surface, the target material is vaporized, and the vapor thereof forms a thin film on a semiconductor surface of an optical disk substrate surface. In addition, it can be used as a discharge power source for various devices that use discharge energy between electrodes.

According to the present invention, by using a simple circuit configuration and the simple normal control methods for an inverter circuit, it is possible to generate reliably a discharge in a discharge load and maintain the stationary discharge state.

What is claimed is:

1. A discharge power supply apparatus for supplying a direct current voltage to a discharge load and discharging the same; comprising:
    an inverter circuit that converts direct current voltage to alternating current voltage;
    a full-wave rectifier circuit that has a plurality of diodes and rectifies said alternating current voltage generated by said inverter circuit; and
    at least one trigger capacitor connected in parallel to one of said diodes of said full-wave rectifier circuit to store a charged voltage,
    wherein, at the start of the discharge of said discharge load, a trigger voltage that is higher than a stationary output voltage is supplied to the discharge load, said trigger voltage being generated by superimposing said charged voltage stored in said trigger capacitor on a direct current voltage obtained by rectifying said alternating current voltage by said full-wave rectifier, and after the start of stationary discharge of said discharge load, the direct current voltage output by said full-wave rectifier circuit is supplied to said discharge load.

2. A discharge power supply apparatus according to claim 1, wherein said full-wave rectifier circuit is a full-bridge rectifier circuit including two serially connected pairs of diodes, and said trigger capacitor is connected in parallel to any one of said pairs of said diodes.

3. A discharge power supply apparatus according to claim 1, further comprising a transformer having a primary winding, to which said alternating current voltage output by said inverter circuit is supplied, and a secondary winding connected to said full-wave rectifier circuit.

4. A discharge power supply apparatus according to claim 3, wherein said transformer has two of said secondary windings, said two secondary windings are connected together serially, said full-wave rectifier circuit is a center tap rectifier circuit, said center tap rectifier circuit is connected to said two secondary windings, and said trigger capacitor is charged up to a voltage equal to the sum of voltages generated by said two secondary windings.

5. A discharge power supply apparatus according to claim 1, wherein, if the leakage current flowing through said discharge load before the start of the discharge is denoted It(A), the stationary discharge voltage is denoted E(V), and the frequency of the alternating current voltage output by said inverter circuit is denoted F(Hz), then the capacitance C(F) of said trigger capacitor is C>It/(E×F), and the capacitance C(F) is equal to or less than the capacitance at which full-wave rectification is carried out when said discharge load is in the stationary discharge state.

6. A discharge power supply apparatus according to claim 2, wherein, if the leakage current flowing through said discharge load before the start of the discharge is denoted It(A), the stationary discharge voltage is denoted E(V), and the frequency of the alternating current voltage output by said inverter circuit is denoted F(Hz), then the capacitance C(F) of said trigger capacitor is C>It/(2×E×F), and the capacitance C(F) is equal to or less than the capacitance at which full-wave rectification is carried out when said discharge load is in the stationary discharge state.

7. A discharge power supply apparatus according to claim 1, wherein additional capacitors are respectively connected in parallel to all of said diodes other than that connected by said trigger capacitor in said rectifier circuit, one of said additional capacitors is an other trigger capacitor, and said trigger capacitor and said other trigger capacitor have an electrostatic capacitance substantially larger than those of the others of said additional capacitors.

8. A discharge power supply apparatus according to claim 1, wherein said plurality of diodes of said rectifier circuit comprise a plurality of diodes connected serially, additional capacitors are respectively and separately connected in parallel to said plurality of serially connected diodes other than that connected by said trigger capacitor, at least one of said additional capacitors is an other trigger capacitor, and said trigger capacitor and said other trigger capacitor have a capacitance substantially larger than those of the others of said additional capacitors.

9. A discharge power supply apparatus according to claim 7, wherein, if the leakage current flowing through said discharge load before the start of the discharge is denoted It(A), the stationary discharge voltage is denoted E(V), and the frequency of the alternating current voltage output by said inverter circuit is denoted F(Hz), then the capacitance of said trigger capacitor is greater than the capacitance of the other capacitors by It/(E×F) or more, and is equal to or less than the capacity that carries out a full-wave rectification when said discharge load is in the stationary discharge state.

10. A discharge power supply apparatus according to claim 3, wherein said inverter circuit is a multi-phase inverter, said transformer is a multi-phase transformer having a plurality of primary windings and secondary windings, and said rectifier circuit is a multi-phase rectifier circuit having a plurality of diode arms.

11. A discharge power supply apparatus for supplying a direct current voltage to a discharge load and discharging the same, comprising:
    an inverter circuit that converts direct current voltage to alternating current voltage;
    a full-wave rectifier circuit that rectifies an alternating current voltage generated by said inverter circuit;
    a trigger capacitor and a trigger diode is connected in series between an input side and an output side of said full-wave rectifier circuit; and
    a charging diode connected between the input side of said full-wave rectifier circuit and the junction of said trigger capacitor and said trigger diode,
    wherein, at the start of discharge of said discharge load, the voltage of said trigger capacitor is superimposed on the voltage of said secondary winding to supply to the discharge load a trigger voltage that is higher than a stationary output voltage of said discharge power supply apparatus, and after the start of a stationary discharge of said discharge load, a direct current power output from said full-wave rectifier circuit is supplied to said discharge load.

12. A discharge power supply apparatus according to claim 11, wherein a smoothing capacitor or a smoothing capacitor and a bypass diode are provided at the output of said full-wave rectifier circuit, and a cathode of said trigger diode and a cathode of said bypass diode are connected.

13. A discharge power supply apparatus according to claim 11, further comprising a transformer having a primary winding, to which the alternating current voltage output by said inverter circuit is applied, and a secondary winding.

14. A discharge power supply apparatus according to claim 13, wherein said transformer has two connected serially secondary windings, said full-wave rectifier circuit is a center tap rectifier circuit comprising a pair of diodes connected serially to each of the terminals of said two secondary windings, and said charging diode is connected between the junction of said two connected serially secondary windings and the junction of said trigger capacitor and said trigger diode.

15. A discharge power supply apparatus according to claim 13, wherein said transformer has two connected serially secondary windings, said full-wave rectifier circuit is a center tap rectifier circuit comprising a pair of diodes connected serially to each of the terminals of said two secondary windings, and said charging diode is connected between the other terminal of said two connected serially secondary windings and the junction between said trigger capacitor and said trigger diode.

16. A discharge power supply apparatus according to claim 11, wherein the capacitance C(F) of said capacitors has values that satisfy the formula:

$$C > It/(F \times E)$$

where It(A) denotes the discharge current before the start of the discharge, E(V) denotes the discharge voltage of the stationary discharge state, and F(Hz) denotes the converted frequency of the inverter circuit, and the capacitance C(F) is equal to or less than the capacity for carrying out full-wave rectification when said discharge load is in the stationary discharge state.

17. A discharge power supply apparatus according to claim 1, further comprising a capacitor connected in parallel to the output of said full-wave rectifier circuit.

* * * * *